O. PUTZKE.
MOWING MACHINE.
APPLICATION FILED JULY 28, 1911.
1,036,145.
Patented Aug. 20, 1912.
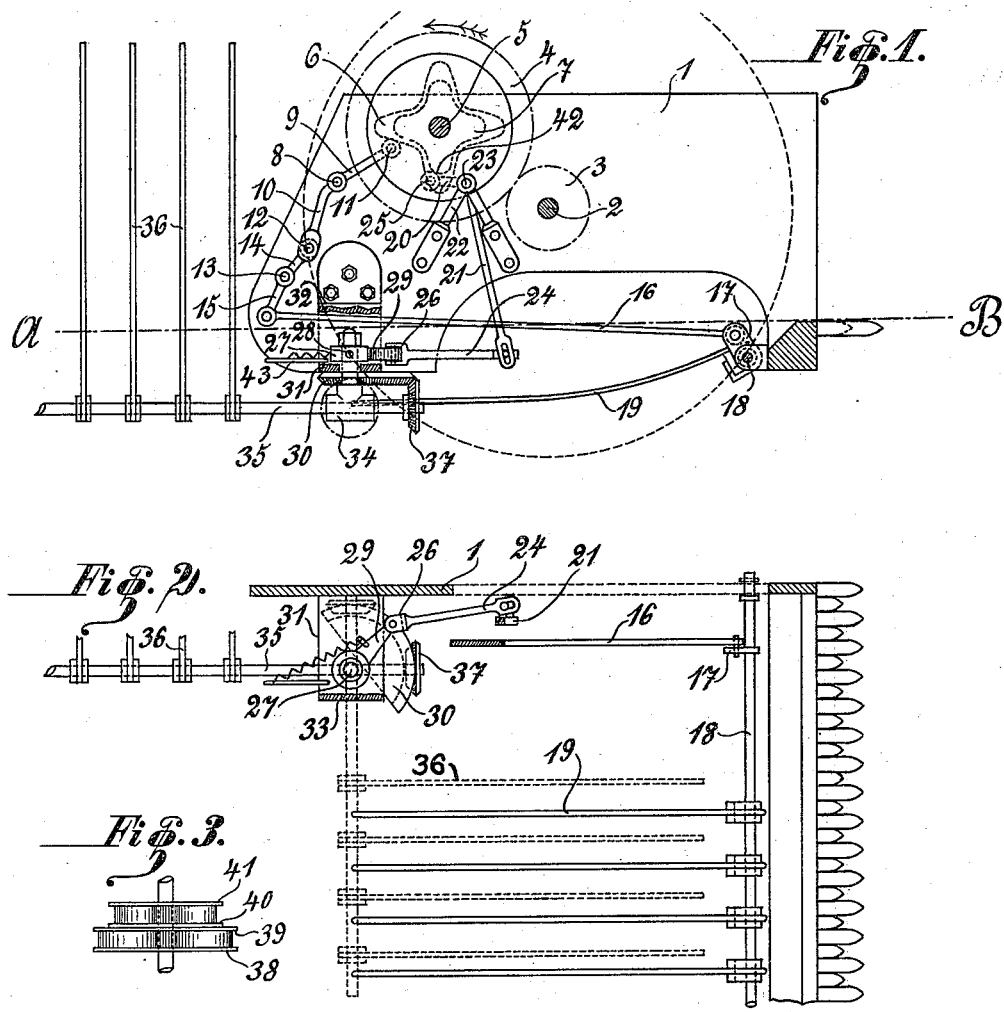
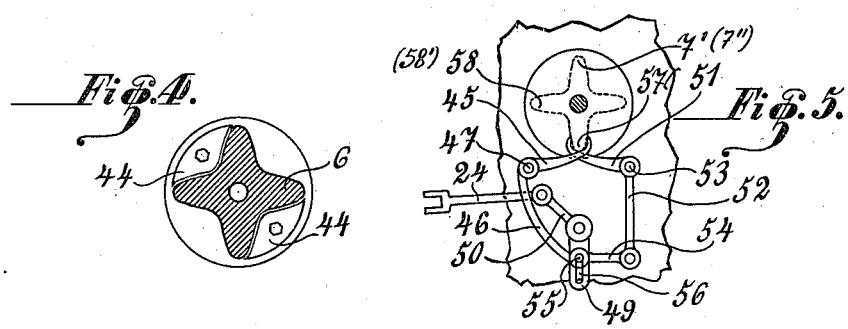
Witnesses
Inventor
Otto Putzke

UNITED STATES PATENT OFFICE.

OTTO PUTZKE, OF HALLE-ON-THE-SAALE, GERMANY.

MOWING-MACHINE.

1,036,145.  Specification of Letters Patent.  Patented Aug. 20, 1912.

Application filed July 28, 1911. Serial No. 641,181.

*To all whom it may concern:*

Be it known that I, OTTO PUTZKE, a subject of the German Emperor, and resident of Halle-on-the-Saale, Germany, have invented certain new and useful Improvements in Mowing-Machines, of which the following is a specification.

This invention relates to improvements in mowing machines, and it consists in that beside the collector thereon a dropper is provided, which is adapted to catch between the members of the former and, by suitable movement of its own members around their common axle and simultaneous turning of the latter to the rear, to lift the grain collected on the conveyer and to place it behind the machine, the collector as well as the dropper being driven and periodically moved by correspondingly acting cam disks through the medium of suitable levers and toothed gearings.

The accompanying drawing shows the improved arrangement.

Figures 1 and 2 are respectively a side view and sectional plan view of the same, while Figs. 3 to 5 show details.

In the side wall 1 of the mowing machine proper, which is not shown on the drawing, the wheel axle 2 is located and provided with a fixed toothed wheel 3. The latter is in gear with a large toothed wheel 4, which is fixed on an axle 5, whereby the cam disks 6 and 7, which are also keyed on the axle 5, are turned in the direction of the arrow when the machine is moved forward. In direct proximity to the disk 6, a double-armed lever 9, 10 is fulcrumed at 8 on the wall 1 and on its arm 9 provided with a roller 11, which is adapted to slide upon the edge of the cam disk 6 when the latter moves. The lever 9, 10 is further connected by the joint 12 with another lever 14, 15 which is fulcrumed at 13 on the wall 1 and which in turn is, by a rod 16 and a link 17, adapted to move the movably located axle 18 to and fro, and thus the collector 19 up and down within an angle of about 45°.

The rear cam disk 7 is adapted to move a lever 20, 21 which is located at 23 on a suitably bent iron angle-piece 22 and with its long arm 21 adapted to reciprocate a rod 24, while its arm 20 carries a sliding-roller 25. At one end 26, said rod is forkshaped and pivotally connected with an arm 29, which by a bolt 28 or the like is fixed on the vertical axle 27. The latter is revolubly mounted in a segmental gear 30, which is fixed on the underside of a horizontal arm 31. The latter is by an iron angle-piece 32 fixed on its free end 33 in a bracketlike way. At its lower end, the axle 27 forms a horizontal bearing 34 in which the axle 35 of a dropper 36 is located. The short end of said axle carries a fixed bevel gear 37, which is in gear with the segmental gear 30.

The cam disks 6, 7 may preferably be provided with circumferential flanges 38, 39 and 40, 41 respectively to safely guide the sliding-rollers 11 and 25 respectively. Of course, the toothed gearing 3, 4 can also be dispensed with, and the cam disk be directly mounted on the wheel axle 2 of the machine. Further, it is preferable to so arrange the bevel gear 37 on its axle 35 that it can be axially shifted thereon, and to connect it then with a suitable device for automatically uncoupling same, for the purpose of effecting an uncoupling after raising the dropper 36 and thus producing a movement of same into a horizontal position only. This being effected, the horizontally placed dropper 36 moves to the front and beneath collector 19. Hereby, the members of the dropper 36 can be extended to the axle 18 of the collector 19, for a better reception of grass or short grain.

It is essential that the above-described dropper can be easily attached to the known grass mowers, whereby the latter can be easily converted into a grain mower.

The mode of operation is as follows:—Upon forward movement of the mowing machine the cam disks 5, 6 are by the toothed wheels 3, 4 set in slow rotation. From the position shown in Fig. 1, the disk 6 is going to slowly depress the arm 9 by one of its cams, whereby through the medium of the system of levers mentioned the collector 19 is gradually moved upward on its axle 18 for an angle of about 45°. In this position, the collector is kept until a certain quantity of cut grain, belonging to one sheaf, has been collected thereon, this being obtained by the particular shape and design of the cam disk 6. Meanwhile, also the cam 42 of the small cam disk 7 has passed beyond the lever arm 20, so that the latter is liberated therefrom. Consequently, the spring 43 pulls the arm 29 back, whereby the horizontal axle 35 is turned to the front for about 90°, while at the same time the dropper 36 assumes a horizontal position, which is shown by the dotted lines in Fig. 2. While, thus, the collector 19 is upwardly directed, the dropper 36 has assumed horizontal (dotted) position in such a way that the members of the collector 19 pass, on their now following quick descent, between those of the dropper 36. Thereupon, the latter is lifted and thus raises the cut grain from the collector, whereupon it is returned on the vertical axle 27 to the rear and at the same time lifted into almost vertical position in such a way that the grain is conveyed to behind the mowing machine. As, however, the thickness of the grain is not always equal every year, for instance with very thin grain, the necessary quantity would not yet have been collected by the periodical lifting and lowering of the collector 19 when the latter descends. This condition is met in that two opposite recessed parts of the circumference of the cam disks 6, 7 are so filled out by insertions 44 that a return of the arm 9 and thus a downward movement of the collector 19 is not possible until said insertion has passed the lever arm 9 (Fig. 4). In a corresponding way, also the operation of the dropper 36 is limited. The fixing of said insertions may be effected in any suitable way.

Of course, the set of gears to operate the dropper 36 can also be replaced by any other suitable arrangement. Such a modification is shown in Fig. 5. For driving the dropper 36 two cam disks 7′ 7″ are provided which are so mounted on the axle 5 that they cover each other. On one of said disks 7′, the arm 45 of a double-armed lever 45, 46 is placed, which lever is fulcrumed at 47 and the other arm 46 of which operates the drawing-rod 24 through the medium of a further lever 49, 50 which is fulcrumed at 50. On the second disk 7″, the free arm 51 of a lever 51, 52 is placed from the opposite side, which lever is fulcrumed at 53 and the other arm 52 of which is by a link 54 also pivotally connected with the lever arm 49. The arm 46 and the link 54 are connected with the lever arm 49 by one and the same pivot 55, which is slidably arranged in a slot 56 of the arm 49. Whereas the disk 7′, when turned in the direction as indicated in Fig. 1, pulls the rod 24 by the system of levers 45, 46 and 49, 50, the latter disk 7″ effects by the system of levers 51, 52, 54 and 49, 50 a back movement of said rod which is effected in that, after the cam 57 of one disk 7′ has influenced the arm 45, the next following cam 58′ of the other disk 7″ acts on the arm 51. In this arrangement, the provision of a spring 43 (Figs. 1, 2) is unnecessary.

I claim:

In a grain and grass mowing machine, a collector, a cam disk adapted to be driven from the wheel axle of the machine, a system of levers connected with said collector and adapted to be operated by said cam disk to periodically move said collector, a dropper adapted to catch between the members of said collector, a fixed horizontal segmental gear, a horizontal rotary axle for said conveyer, a horizontally movable bearing for said axle, a bevel gear on one end of said axle designed to gear with said fixed segmental gear, and means to operate said conveyer, for the purpose set forth.

In testimony whereof I have hereunto set my hand in the presence of two subscribing witnesses.

OTTO PUTZKE.

Witnesses:
RUDOLPH FRICKE,
ALBERT R. MORAWETZ.

Copies of this patent may be obtained for five cents each, by addressing the "Commissioner of Patents, Washington, D. C."